March 4, 1941.  C. TREE  2,233,858
COLLET INDEX FIXTURE
Filed Jan. 8, 1940  2 Sheets-Sheet 1
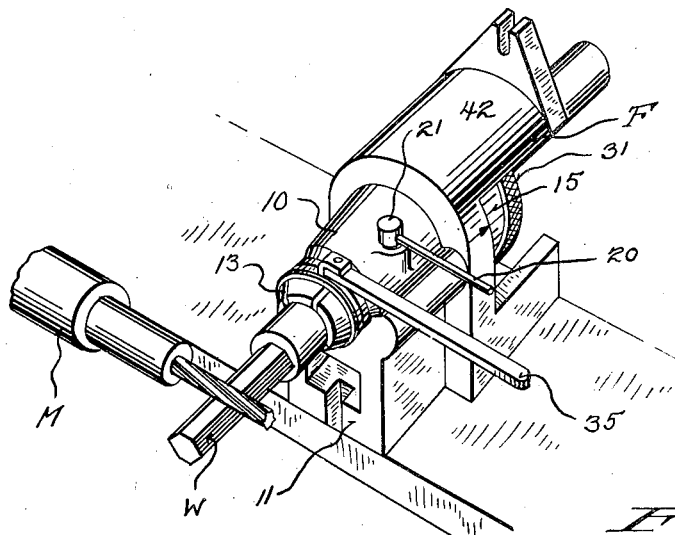
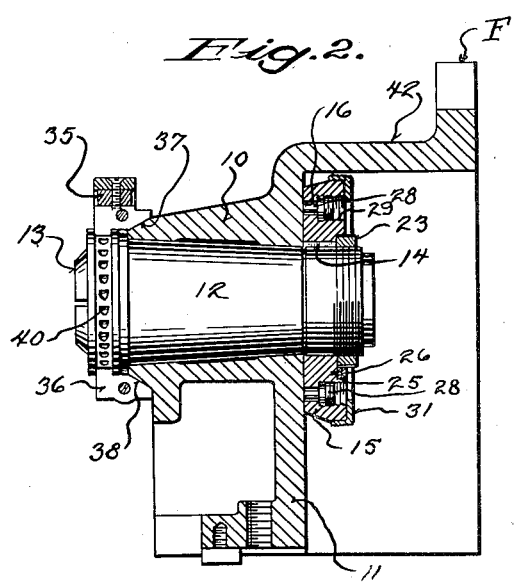
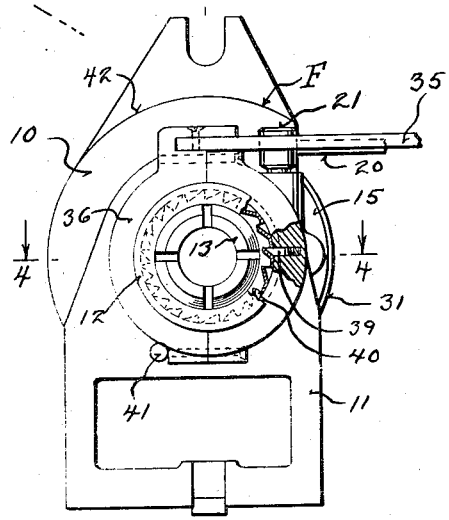
Inventor
Charles Tree
By
Attorneys March 4, 1941.       C. TREE       2,233,858
COLLET INDEX FIXTURE
Filed Jan. 8, 1940       2 Sheets-Sheet 2
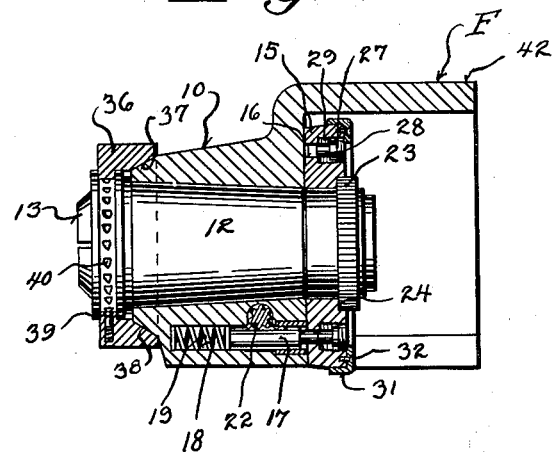
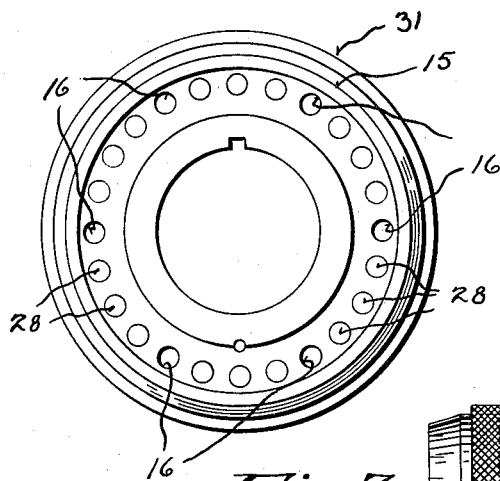
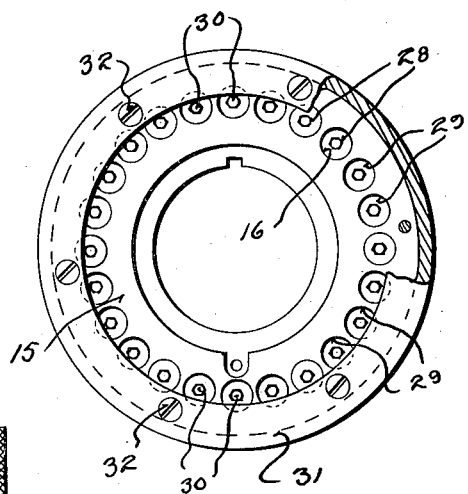
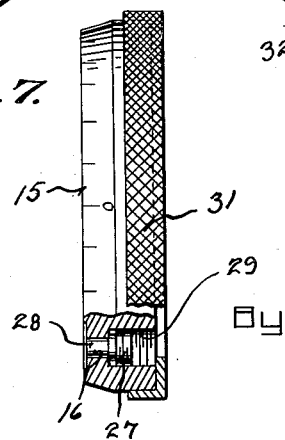
Inventor
Charles Tree
By 
Attorneys Patented Mar. 4, 1941

2,233,858

UNITED STATES PATENT OFFICE 2,233,858

COLLET INDEX FIXTURE

Charles Tree, Racine, Wis.

Application January 8, 1940, Serial No. 312,988

6 Claims. (Cl. 90—57)

This invention appertains to work holders, and more particularly to a novel collet fixture for effectively holding and indexing work while being operated upon by a miller, grinder, shaper, drill press and like machines.

One of the primary objects of my invention is to provide a collet index fixture which can be set for any predetermined index work, whereby the work can be quickly and accurately set to the desired positions without danger of error.

Another salient object of my invention is the provision of a collet index fixture having an index plate provided with a plurality of openings, with means for rendering only certain selected openings operative for the holding index pin or plunger, so that the work can only be held in the desired positions while being operated upon by the machine tool.

A further important object of my invention is the provision of an index plate provided with a predetermined number of openings having threaded therein adjustable plugs or set screws movable into and out of operative position for permitting the entrance of the index pin or plunger only in the desired selected openings.

A further object of my invention is the provision of means whereby the plugs or set screws will be tightly held in their operative or inoperative positions, so that the same will not work loose incident to the manipulation of the spindle, collet, and work.

A still further object of my invention is the provision of a novel attachment carried by the forward end of the body of the fixture for facilitating the turning of the spindle, the collet, and the work held thereby.

With these and other objects in view, the invention consists in the novel construction, arrangement, and formation of parts, as will be hereinafter more specifically described, claimed, and illustrated in the accompanying drawings, in which drawings:

Figure 1 is a perspective view of my novel collet index fixture, showing the same used for holding a bar of solid stock in position relative to the tool of a milling machine.

Figure 2 is a longitudinal sectional view through my novel fixture, taken on the line 2—2 of Figure 3.

Figure 3 is a front elevational view of my novel fixture.

Figure 4 is a longitudinal sectional view through my fixture, taken at right angles to Figure 2 and on the line 4—4 of Figure 3, looking in the direction of the arrows.

Figure 5 is an enlarged elevational view of my index plate, showing the inner face thereof.

Figure 6 is an elevational view of my index plate, taken on the same scale as Figure 5, and showing the outer face of the plate, parts of the view being shown broken away and in section.

Figure 7 is an edge elevational view of the index plate, with parts thereof broken away and in section to illustrate structural detail, the view showing one of the adjustment plugs in its operative position for preventing the entrance of the index pin or plunger in its opening.

Referring to the drawings in detal, wherein similar reference characters designate corresponding parts throughout the several views, the letter F generally indicates my novel collet index fixture. The fixture F is of a universal character and can be disposed in a horizontal or vertical position upon the bed or table of a metalworking machine.

The fixture can be used with milling machines, grinders, shapers, drill presses, and the like, and can be held in a vise, on a magnetic chuck, or bolted to the table of any machine, and can be used for many different purposes, such as milling keyways, punches, pinions, flutes in end mills, taps, counterbores, and cutting gear and sprocket teeth. With the fixture, squares on tap shanks, tangs, flats on locaters, multiple slots and notches of all kinds are easily milled.

As illustrated, the novel collet index fixture F includes a body 10 mounted upon any preferred type of base 11. Rotatably mounted within the body 10 is a hollow tapered spindle 12 for receiving any preferred type of collet 13. The collet 13 and the spindle 12 are interconnected so that the collet will turn with the spindle. In the present instance, I have shown a collet of the type for permitting the work to extend therethrough. The work is indicated by the reference character W and is being operated upon by the tool of a milling machine M for making a hexagonal bar.

The rear end of the spindle 12 extends through the body 10 and has keyed thereon, as at 14, my novel index plate 15. Thus, the index plate 15 turns with the spindle, and, in fact, the index plate can be utilized for rotating the spindle, when desired. The plate 15 is provided with a predetermined number of openings 16 for receiving the sliding index pin or plunger 17. In the present instance, the index plate is shown with twenty-four holes to give two, three, four, six, eight, twelve, and twenty-four divisions or 15° spacings. The index pin or plunger 17 is slidably mounted within a way 18 formed in the body, and the pin or plunger is normally urged by an expansion spring 19 toward the index plate 15, so that the plunger will automatically enter a selected opening.

A lever 20 can be employed for retracting the plunger, and this lever is secured to a shaft 21, rotatably mounted in the body 10. The inner end of the shaft has formed thereon or secured thereto a pinion 22 for engaging a rack formed on one edge of the pin or plunger 17.

In order to insure the holding of the index plate on the spindle 12, the rear end of the spindle can be externally threaded for the reception of a binding collar 23. The outer face of the index plate 15 can be rabbeted, as at 24, to receive the binding collar. The outer face of the collar can be milled, and in order to prevent the accidental turning of the collar, the same can be engaged by a holding finger 25 held on the index plate by a machine screw 26.

When the plunger or index pin 17 is retracted against the tension of its spring, the index plate and spindle can be turned, but, obviously, as soon as the plunger is released and the same enters one of the openings in the index plate, further turning movement of the spindle and the collet is prevented, and, hence, the work or stock is held in position against movement.

In order to insure the entrance of the plunger or pin 17 only in desired openings, the openings 16 have their walls enlarged and internally threaded, as at 27, and plugs or pins 28 are threaded into the openings. The forward ends of the pins are reduced in diameter, as at 29, so that the same can enter easily into the inner reduced ends of the openings. As shown in Figure 7, when the reduced ends 29 of the pins or plugs enter into the small ends of the openings, the entrance of the index pin or plunger 17 into the openings will be prevented. The outer ends of the plugs are provided with polygonal-shaped sockets 30 for the provision of a turning wrench or tool. When the plugs are turned into the openings, the shoulders formed on the pins will frictionally bind against the annular shoulders in the walls of the openings formed by the enlargement of the openings, and, hence, displacement of the set screws or plugs from their operative position will be prevented.

A milled ring 31 of an angle-shape in cross section is fitted over the outer end of the index plate 15 and is held thereon by the use of machine screws 32. A part of the ring 31 extends over the outer ends of the openings 16, and, thus, when the set screws or plugs are threaded out to their inoperative positions, the same will bind tight against the ring 31, and, thus, the set screws or plugs 28 will be prevented from working loose when the same are in their operative position.

As stated, the work W is being milled on six sides to form a hexagonal-shaped bar, and, thus, in the present showing, all of the set screws or plugs, with the exception of six, are threaded into the openings 16 tight against the shoulders until their forward ends are flush with the inner face of the index plate.

Thus, there will be six openings left for the entrance of the index pin or plunger 17, and the selected openings left are at the desired points for facilitating the proper indexing or turning of the spindle to the desired positions for permitting the work to be properly acted upon by the tool to form the six-sided bar. The outer face of the index plate can be graduated to facilitate the setting of the desired set screws.

The spindle with the collet and work can be turned in any preferred manner, such as by gripping the index plate. It is preferred, however, to turn the spindle 12 by a hand lever 35. This hand lever 35 is rigidly secured to a sectional two-piece collar 36. The sections of the collar are held together by suitable screws, and the collar is placed on the front end of the fixture F. As shown, the inner face of the collar is provided with a bearing surface 37 for resting against a tapered bearing face 38 formed on the front of the body 10 for that purpose. The two-part collar 36 carries a spring-pressed pawl 39 for coaction with ratchet teeth 40 formed in the outer face of the spindle. The pawl 39 is adapted to engage the walls of the ratchet teeth when the collar is turned in one direction, and the pawl is adapted to slide or ratchet over the teeth when the collar is turned in a reverse direction. The turning of the collar can be limited by a pin 41 connected with the body 10 and arranged in the path of a part of the collar.

If desired, the body 10 can carry a guard 42 for partially surrounding the index plate, and this guard can also carry means for facilitating the holding of the fixture in a vertical position.

From the foregoing description it can be seen that I have provided a novel collet index fixture which will permit the accurate indexing of the work without error upon the part of the operator.

Changes in details may be made without departing from the spirit or the scope of my invention, but what I claim as new is:

1. A collet index fixture comprising, a body, a spindle rotatable in the body, a collet for the work carried by and rotatable with the spindle, an index plate fitted on the spindle having a plurality of openings therein, a slidable index pin on the body for movement into and out of selected openings for holding the index plate, spindle, and collet in any desired position, and adjustable means in said openings for closing certain of the openings when in one adjusted position against the entrance of the index pin.

2. A collet index fixture comprising, a body, a spindle rotatable in the body, a collet for the work connected with the spindle for rotation therewith, a removable index plate keyed to the spindle having a predetermined number of openings therein, a retractable index pin movable into the openings upon the turning of the index plate and spindle, and threaded plugs carried by the walls of the opening movable to the front and rear of said openings to open and close the openings for the entrance or refusing of the pin.

3. A collet index fixture comprising, a body, a spindle rotatable in the body, a collet for the work connected with the spindle for rotation therewith, a removable index plate keyed to the spindle having a predetermined number of openings therein, a retractable index pin movable into the openings upon the turning of the index plate and spindle, threaded plugs carried by the walls of the openings movable to the front and rear of said openings to open and close the openings for the entrance or refusing of the pin, and means for holding the plugs in either one of their adjusted positions.

4. A collet index fixture comprising, a body, a spindle rotatable in the body, a collet for the work connected with the spindle for rotation therewith, a removable index plate keyed to the spindle having a predetermined number of openings therein, a retractable index pin movable into the openings upon the turning of the index plate and spindle, threaded plugs carried by the walls of the opening movable to the front and rear of said openings to open and close the openings for the entrance or refusing of the pin, and means for holding the plugs in either one of their adjusted positions, said means including cooperating stop shoulders on the plugs and walls of the openings, and a binding ring carried by the index plate.

5. An index plate for a collet index fixture comprising, an annular body for receiving a fixture spindle, said body having a plurality of equidistantly spaced, internally threaded openings therein, and plugs threaded in said openings movable toward and away from the front of the plate for closing said openings.

6. An index plate for a collet index fixture comprising, an annular body for receiving a fixture spindle, said body having a plurality of equidistantly spaced shoulder openings therein, threaded plugs fitted in the openings movable toward and away from the front of the plate, said plugs having shoulders thereon for binding engagement with the shoulders of the openings, and a binding ring fitted over the rear end of the plate having a portion thereof overhanging the outer ends of the openings, whereby the plugs can be turned into frictional contact with said ring.

CHARLES TREE.